United States Patent [19]

Loeffelmann et al.

[11] Patent Number: 4,731,100
[45] Date of Patent: Mar. 15, 1988

[54] METHOD AND APPARATUS FOR WASHING A PLURALITY OF FILTER ELEMENTS

[75] Inventors: Rudolf Loeffelmann, Langenfeld; Hubert Freese, Duesseldorf; Ulrich Martini, Monheim, all of Fed. Rep. of Germany

[73] Assignee: Henkel Kommanditgesellschaft auf Aktien, Duesseldorf, Fed. Rep. of Germany

[21] Appl. No.: 797,177

[22] Filed: Nov. 8, 1985

Related U.S. Application Data

[63] Continuation-in-part of Ser. No. 607,344, May 4, 1984, abandoned.

[30] Foreign Application Priority Data

May 6, 1983 [DE] Fed. Rep. of Germany ....... 3316527

[51] Int. Cl.⁴ .......................................... B01D 46/04
[52] U.S. Cl. .......................... 55/96; 55/242; 55/294; 55/302
[58] Field of Search ............... 55/96, 282, 302, 242, 55/294

[56] References Cited

U.S. PATENT DOCUMENTS

| | | | |
|---|---|---|---|
| 2,237,417 | 4/1941 | Croft | 55/96 |
| 3,053,030 | 9/1962 | Smith | 55/242 |
| 3,095,289 | 6/1963 | Egan | 55/96 |
| 3,623,910 | 11/1971 | Calhoun et al. | 55/242 |
| 4,046,525 | 9/1977 | Matsuo et al. | 55/302 |
| 4,082,523 | 4/1978 | Pausch | 55/302 |
| 4,120,671 | 10/1978 | Steinmeyer | 55/96 |
| 4,461,702 | 7/1984 | Furukawa | 55/302 |

FOREIGN PATENT DOCUMENTS

| | | | |
|---|---|---|---|
| 2146746 | 3/1973 | Fed. Rep. of Germany | 55/302 |
| 2521828 | 11/1976 | Fed. Rep. of Germany | 55/242 |
| 3022203 | 12/1981 | Fed. Rep. of Germany | 55/242 |
| 1289890 | 2/1962 | France | 55/302 |
| 791510 | 3/1958 | United Kingdom | 55/242 |

*Primary Examiner*—Bernard Nozick
*Attorney, Agent, or Firm*—Henry E. Millson, Jr.; Mark A. Greenfield; Real J. Grandmaison

[57] ABSTRACT

A method and apparatus for simultaneously washing a plurality of generally tubular or sock-like filtering elements of a gas filtering apparatus without removing the elements from the apparatus, the filter elements being disposed in a regular array of rows and columns within a housing between an inlet and an outlet thereof. The method includes positioning in the housing a liquid conduit having a plurality of axially spaced spray nozzles for delivering washing liquid along one or more rows of elements and supplying washing liquid to the conduit.

11 Claims, 5 Drawing Figures

METHOD AND APPARATUS FOR WASHING A PLURALITY OF FILTER ELEMENTS

This application is a continuation-in-part of application Ser. No. 607,344, filed May 4, 1984, now abandoned.

BACKGROUND OF THE INVENTION

1. Field of the Invention

This invention relates to methods and apparatus for cleaning sock-like filter elements of a gas filtering apparatus with the filter elements in place.

2. Description of the Prior Art

In filters for gases, generally tubular or socklike filter elements made of woven cloth or needle felts or other natural or synthetic fibers are often used as filter media. Over a prolonged period, these filter elements can become clogged with solid particles or volatile organic constituents resulting in a gradual reduction in the volume flow of gas filtered through the system due to decreased permeability of the filter elements. As a result, more energy is required to maintain the system's operational pressure.

In order to remedy this situation several solutions have been proposed, including the use of polytetrafluoroethylene fibers for producing filter elements having "anti-adhesive" characteristics. While polytetrafluoroethylene filter elements are somewhat effective, they are relatively expensive and demonstrate poor mechanical strength in comparison to other fibers such as woven cloth or needle felts.

Another solution is the use of pneumatic or mechanical cleaning devices to clean the filter elements. As described in pending U.S. application Ser. No. 571,253, (filed Jan. 16, 1984), pneumatic or mechanical cleaning can be carried out periodically with the filter in operation and can effectively remove many particulates from the filter elements. However, solid particles and even volatile organic constituents can still accumulate over a prolonged period despite such cleaning because particulates, which generally accumulate on the external surfaces of the elements, can work their way into the fibers, reduce the permeability of the filters, increase the energy consumption of the filtering apparatus and reduce the overall efficiency of the operation.

Hence, the filter elements must periodically be removed from the apparatus and thoroughly washed. These washing operations are usually labor-intensive and sacrifice production because of extended periods of "down time." In addition, removal of the filter elements can be dangerous to health, especially where fine particulates are introduced in the breathing air of the technicians servicing the apparatus.

DESCRIPTION OF THE INVENTION

Figure 1:
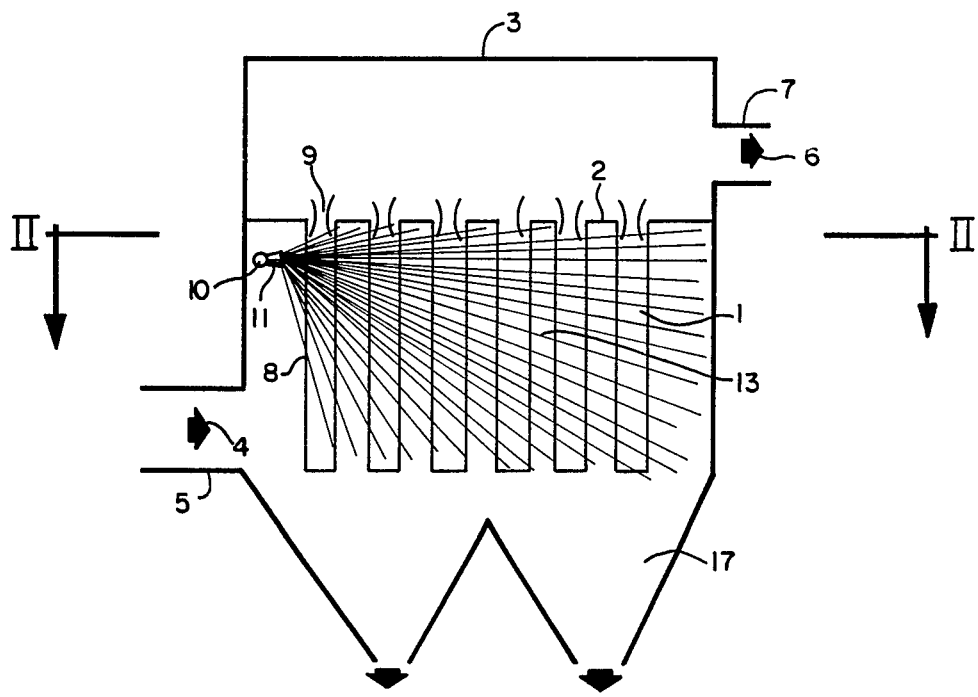
FIG. 1 is a vertical section taken through a gas filter apparatus having generally tubular filter elements disposed in a regular array of rows and columns and having an embodiment of the invention incorporated therein.

Accordingly, one object of the present invention is to enable through cleaning of filter elements in place, without contaminating the breathing air of technicians servicing the unit and without introducing fine particulates and other pollutants into the atmosphere. Another object of the invention is to achieve cleaning of the filter elements without labor-intensive, production-sacrificing costs associated with the methods discussed above.

Still another object of the present invention is to provide a method and apparatus for substantially removing the solid particles and/or volatile organic constituents that may accumulate on or within the filter elements despite mechanical or pneumatic cleaning.

Yet another object of the present invention is to provide a method and apparatus for simultaneously cleaning the exteriors and interiors of the filter elements avoiding the additional costs associated with complex anti-adhesive organic filtering fibers, and increasing the long term operating efficiency of gas filtering apparatus.

As embodied and broadly described herein, the present invention provides a method and apparatus for washing a plurality of generally tubular or sock-like filter elements of a gas filtering apparatus without removing the elements from regular array of rows and columns in a housing between an inlet for dust-laden gas and an outlet for filtered gas. The gas flows from the exterior of the elements to the interior of the elements, with dust accumulating primarily on the exterior of the elements. The method comprises positioning within the filter housing a liquid conduit having a plurality of spray nozzles axially spaced on the conduit for delivering a plurality of jets of washing liquid along one or more rows of filter elements; and supplying washing liquid through the conduit for discharge through the nozzles to clean a plurality of filter elements.

Preferably, the spray of washing liquid from the nozzles is confined to a fan-shape having a narrow spray portion for traversing between adjacent rows of elements and a wide spray portion expanding in a direction axial of the filter elements for washing the exterior surfaces of the filter element.

It may be preferred to align the conduit with a single row of filter elements and spray into the interiors thereof. In this embodiment extensions may be provided between the conduit and the spray nozzles for projecting the nozzle axially of the filter elements.

In all embodiments, water or other suitable fluids can be used as the washing liquid and can be heated to facilitate efficient cleaning.

Other objects and advantages of the invention will become apparent from consideration of the following detailed description taken in connection with the accompanying drawings which constitute part of this specification. In the drawings, preferred embodiments of the present invention are depicted. However, it is to be understood that the invention is not limited to the details disclosed but includes all variations and modifications within the spirit of the invention and the scope of the appended claims.

Reference will now be made in detail to the present preferred embodiments of the invention, examples of which are illustrated in the accompanying drawings.

A method and apparatus are provided for washing a plurality of generally tubular or sock-like filter elements of a gas filtering apparatus, the filter elements being disposed in a regular array of rows and columns within a housing between an inlet for dust-laden gas and an outlet for filtered gas.

The method includes the steps of positioning in the housing a liquid conduit having a plurality of spray nozzles axially spaced apart on the conduit for delivering a plurality of jets of washing liquid along one or more rows of elements and supplying washing liquid through the conduit for discharge through the nozzles to wash the filter elements.

As embodied in FIG. 1, filter elements 1 are generally tubular or socklike and are arranged in a regular array of rows and columns which depend from orifice plate 2 in housing 3. Dust-laden gas 4 enters housing 3 through inlet 5 and filtered gas 6 exits through outlet 7. The gas flows through the exterior surface 8 of filter elements 1 and out the open end 9 of the elements 1, with dust accumulating primarily on the exterior surface 8 of elements 1.

Figure 2:
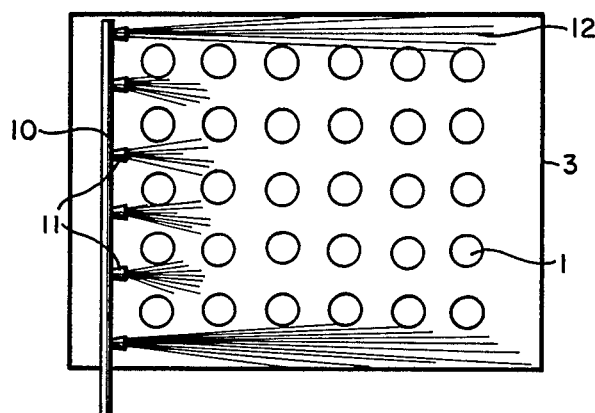
FIG. 2 is a horizontal section taken along line II—II in FIG. 1.

As depicted in FIGS. 1 and 2, liquid conduit 10 having a plurality of spray nozzles 11 axially spaced on the conduit is positioned within housing 3 such that each nozzle 11 delivers a jet of washing liquid between substantially adjacent rows of filter elements 1, or between one row of filter elements and a wall of housing 3. Nozzles 11 are spaced at a distance substantially equal to space between adjacent rows of elements 1.

Washing liquid is supplied through conduit 10 and discharged substantially horizontally across housing 3 for cleaning the exterior or upstream surface of elements 1 from a single position of conduit 10. Preferably, conduit 10 is disposed on inlet side of housing 3.

In the embodiment of FIGS. 1 and 2, nozzles 11 shape the jets of a washing liquid into a fan-shape having a narrow, horizontally confined, linear portion 12 for traversing between rows of elements 1 and a vertically broad portion 13 which expands in a direction axial of the filter elements to insure cleaning along the axial length of elements 1. In this way, the plurality of fan-shaped jets of washing liquid can intensively wet and flush all the filter elements 1.

In the embodiment of FIGS. 1 and 2, conduit 10 can be vertically moveable during washing of filter elements 1.

Figure 3:
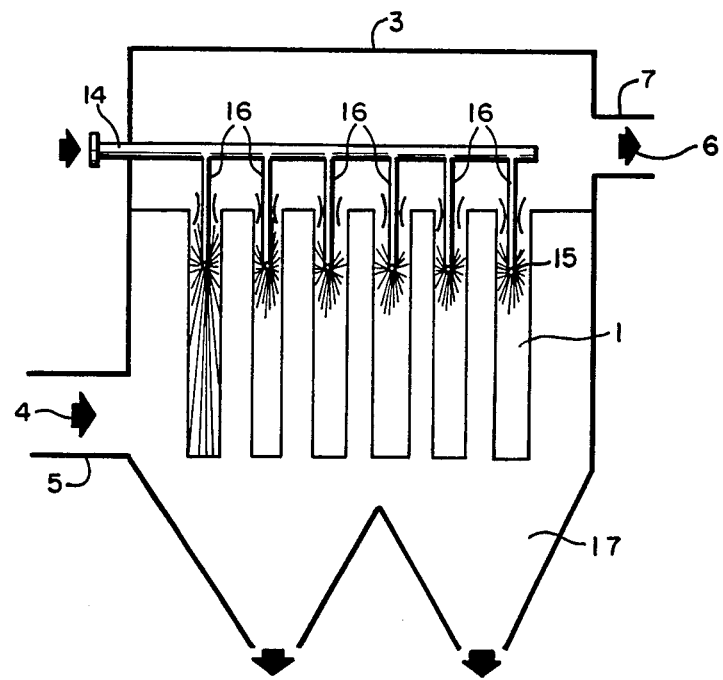
FIG. 3 is a vertical section similar to FIG. 1, but incorporating a second embodiment of the invention.

Referring now to FIG. 3, a second embodiment of the present invention is depicted. Conduit 14 having a plurality of axially spaced apart spray nozzles 15 is positioned within housing 3 for delivering washing liquid to the interior of filter elements 1. In this embodiment, the washing liquid flows in a direction opposite to the gas flow through the housing. The washing liquid can wash both surfaces of elements 1 as it passes through the elements.

Spray nozzles 15 preferably depend from conduit 14 on extensions 16 which extend into the interiors of filter elements 1.

Conduit 14 is mounted within housing 3 for movement both horizontally and vertically. During washing of one row of elements 1, conduit 14 can be moved vertically thereby moving nozzle 15 on extensions 16 axially of elements 1. This permits complete washing of the full length of the elements. After one row has been washed, conduit 14 is moved horizontally to line up with another row of elements. Alternatively, a separate conduit can be provided for each row of elements 1.

In all of the depicted embodiments, washing liquid from the cleaning operation can be drained from housing 3 through dust funnels 17 or removed by other conventional means.

After cleaning, the filter elements are dried by passing air heated to about 100° C. through the filter for a period of approximately 1 hour. Adequate drying can also be obtained if the filter is not used for a relatively long time after washing.

In both embodiments, the washing units are preferably designed in such a way that all the filter elements of at least one row or column can be cleaned at the same time. Water is used as the washing liquid in the case of water-soluble products. Tests have shown that the washing time is shortened by higher water temperatures; thus, the washing liquid may be heated. Water containing suitable additives or any other cleaning liquid can also be used. Washing from the dust-laden air side and from the clean air side can be carried out simultaneously and also successively. In many cases, washing of the type shown in FIGS. 1 and 2 or in FIG. 3 is sufficient. However, the cleaning effect can be intensified by switching on a conventional pneumatic or mechanical cleaning system during the washing of the filter elements in accordance with the invention.

Obviously, many modifications and variations of the present invention are possible in light of the above teachings. It is, therefore, to be understood, that within the scope of the pended claims, the invention may be practiced otherwise than as specifically described.

In gas-filtering apparatus of the type in which this invention is useful, the filter element (such as a tube) surrounds a supporting basket which is fastened to a perforated plate located between dusty air to be filtered and the clean, filtered air regions. The filter element is surrounded on the outside by dusty air, which penetrates through the filter element to its inside, while depositing the entrained dust particles on the outside.

In order to keep the pressure differential, the flow volume, and the filtering efficiency constant, it is known to clean the elements during operation, for example by means of short-term compressed air pulses from a compressed air line through a jet injector into the tube interior. In this manner, a brief pressure excess is developed on the inside of the tube, which inflates it and causes air to pass in reverse (from inside to outside) thus dislodging accumulated dust particles. An alternate method of cleaning the filter elements during operation, is disclosed in U.S. Pat. No. 4,082,523, and includes striking the filter element from inside and then subjecting it to an exterior compressed air impulse.

Since none of the above cleaning during operation is entirely successful, components deposit on the filter medium which can only be removed by washing. This more thorough cleaning, also known as regeneration, is the purpose of this invention. In the present invention, regeneration of the filter elements can be accomplished without the expensive disassembly of the filter elements and support baskets.

Thus, the present invention comprises:

(1) a first assembly of spray nozzles, which preferably are stationary, and which spray cleaning liquid in fan-shaped patterns between the rows of filter elements and against their exteriors, as shown in FIGS. 1 and 2; and (2) a second assembly of spray nozzles, which preferably are mobile, in that they can be raised and lowered as well as moved from row to row of filter elements, and which spray cleaning liquid in a conical 360° pattern inside each of the filter elements, as shown in FIG. 3.

The fan-shaped spray pattern of the first assembly may be at an angle of up to 240° in a plane passing between each row of elements, and obviously should be narrow in its perpendicular plane, so that it impinges upon the exteriors of each row of filters tangentially. The fan-shape plane is shown in FIG. 1 and the perpendicular narrow plane is shown in FIG. 2. Incidentally, the first assembly is also useful for extinguishing a fire inside the filter apparatus, with either manual operation or automatic operation using a temperature sensor and control set for predetermined limits.

The second assembly of spray jets for the inside of the filters, as shown in FIG. 3, has two directions of mobility. The first mobility direction is verically up and down, whereby the second assembly spray nozzles are inserted into the filter elements by lowering the entire conduit 14—extension 16—spray nozzle 15 assembly into the elements when they are to be cleaned. The entire inside length of the filter element may thus be subjected to the cleaning liquid spray. The second mobility direction is horizontally back and forth, whereby the second assembly, when it is outside the filter elements, may be moved from one row of filter elements to the next, so that successive rows may be cleaned using only one second assembly. Variations of the second assembly include utilizing a plurality of parallel conduits 14, with attached extensions 16 and spray nozzles 15, whereby more than one row of filter elements may be internally spray washed simultaneously. In a further variation a mass array of second assembly spray nozzles may be used, one such nozzle located over each filter element and mounted for only vertical motion. Such a mass assembly could also be stationary mounted, provided that the position of the nozzles 15 and extensions 16 do not interfere with the filtering operation.

Specific means for moving either assembly of spray nozzles (when the particular assembly is mobile) are not critical and do not form a part of this invention.

Thus, the entire first assembly may be guided for vertical motion by a track using manual or powered means. The first assembly may also be moved by rotating liquid conduit 10 along it's axis, to adjust th direction of spray. However, as indicated above, the first assembly is preferably stationary.

The second assembly may be moved vertically manually or by any power means, such as an electric motor. Similarly, the second assembly may be moved horizontally manually or by any power means, such as an electric motor. The second assembly may be suspended and moved by any suitable means, such as a gantry crane, semigantry crane, counterbalanced hammerhead crane, overhead traveling crane, or the like. The means for suspending and/or moving the first or second assembly is not critical to this invention, and therefore are not shown in the drawings.

Figure 4:
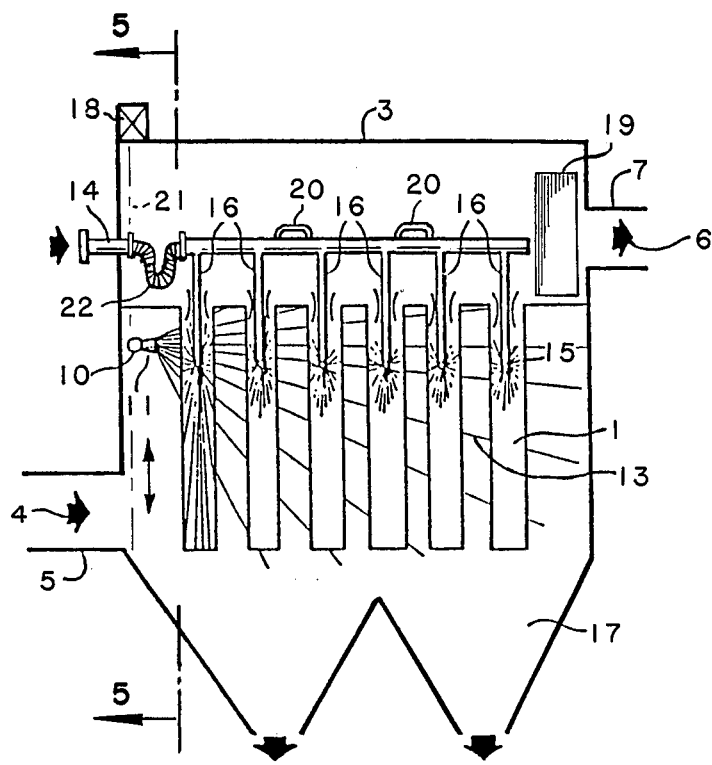
FIGS. 4 and 5 are composite view of FIGS. 1 and 3 illustrating both the first cleaning assembly and the second cleaning assembly.
Figure 5:
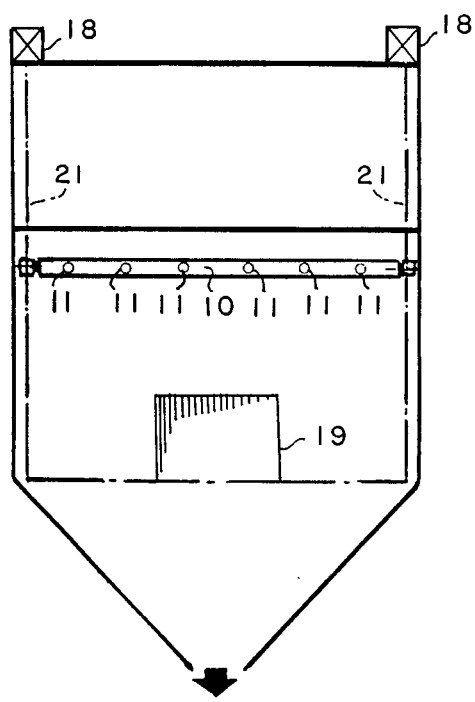

An additional drawing is now presented (FIGS. 4 and 5), which is merely a composite of original FIGS. 1 and 3, and which illustrates both the first assembly and the second assembly, as employed simultaneously, for cleaning both the inside of the filters and the outside of the filters, at the same time. The identification of the elements is the same as in FIGS. 1 and 3. The jet vertical portion (i.e. fan-shaped spray) 13 is shown behind the filter elements 1, rather than in front of the filter elements 1 as shown in FIG. 1, to avoid any confusion with the spray from nozzles 15. For the same reason, the spray 13 has been depicted with fewer radiating lines. This does not imply any change in the nature, force, or direction of spray 13 between FIGS. 1 and 4.

What is claimed is:

1. A method of washing a plurality of generally tubular open at the top and closed at the bottom filter elements of a gas filtering apparatus without removing the elements from the apparatus, the filter elements being vertically suspended from an orifice plate and disposed in a regular array of rows and columns within a housing between an inlet for dustladen gas and an outlet for filtered gas, the gas flowing from the exterior surface to the interior surface of the elements, comprising the steps of:

positioning in said housing adjacent a side of said array a horizontal, vertically displaceable first liquid conduit having a plurality of first spray nozzles axially spaced on said conduit for delivering a plurality of first jets of washing liquid exteriorly along one or more rows of filter elements; supplying washing liquid through said first conduit for discharge through said nozzles to wash exteriorly said filter elements;

positioning in said housing above said array a horizontal, horizontally and vertically displaceable, second liquid conduit having a plurality of second spray nozzles axially spaced on said conduit for delivering a plurality of second jets of washing liquid interiorly to the filter elements of at least one row; and supplying washing liquid through said second conduit for discharge through said second nozzles to wash interiorly said filter elements;

said first and second conduits being supplied with washing liquid simultaneously or successively.

2. The method of claim 1 wherein said first liquid conduit is positioned adjacent a downstream side of said array and normal to the axes of said elements and said nozzles are aligned with individual elements in a row.

3. The method of claim 1 including the step of providing extensions between said second liquid conduit and said second nozzles for projecting said second nozzles axially within said filter elements.

4. The method of claim 1 wherein said first liquid conduit is positioned adjacent an upstream side of said array normal to the axes of said elements and said nozzles are aligned between adjacnt rows of elements.

5. The method of claim 4 wherein said first spray nozzles are axially spaced at intervals substantially equal to the intervals between adjacent rows of said filter elements.

6. The method of claim 4 including the further step of confining the spray from said first spray nozzles to a fanshape having a narrow portion for traversing between adjacent rows of said elements and a wide portion expanding in a direction axial of said filter elements for washing the exterior surfaces of the filter elements.

7. The method of claim 4 wherein said jets of washing liquid are delivered substantially from the inlet side of the housing.

8. The method of claim 4 including moving said first liquid conduit in a direction parallel to the axis of said filter elements while supplying liquid through said first liquid conduit.

9. The method of claim 1 further including the step of heating the washing liquid.

10. An apparatus for washing a plurality of generally tubular open at the top and closed at the bottom filter elements of a gas filter apparatus, said elements being vertically suspended from an orifice plate and disposed in a regular array of rows and columns within a housing between an inlet for dust-laden gas and an outlet for filtered gas, the gas flowing from the exterior surface to the interior surface of said elements, said apparatus comprising:
 (a) a first liquid conduit disposed in said housing along one side of said array normal to the axes of said elements, said conduit being moveable in a direction axial of said elements;
 (b) a plurality of nozzles fixed to and axially spaced along said first conduit, said first nozzles being spaced a distance substantially equal to the distance between adjacent rows of said elements and said nozzles being shaped and aligned to project a spray of a liquid passing therethrough between adjacent rows of elements in a shape having a narrow portion substantially traversing between adjacent rows of elements and a wide portion expanding in a direction axial of said elements to wash the exterior surfaces of all said elements simultaneously;
 (c) a second liquid conduit disposed in said housing above said array and aligned with a single row of said elements, said conduit being moveable in a direction axial of said elements and being moveable between rows of said array; and
 (d) a plurality of second nozzles fixed to and axially spaced along said second conduit, said second nozzles being spaced a distance between adjacent columns of said elements, each said nozzle being aligned with a single element in said single row to project a spray of a liquid passing therethrough onto the interior surface of said element.

11. The apparatus of claim 10 also including an extension disposed between each said second nozzles and said second conduit to project said nozzles into the interior of said elements.

* * * * *